(12) United States Patent
Milwertz

(10) Patent No.: US 7,780,066 B2
(45) Date of Patent: Aug. 24, 2010

(54) POWER CAPACITOR

(75) Inventor: Per Milwertz, Ludvika (SE)

(73) Assignee: ABB Technology Ltd, Zürich (CH)

( * ) Notice: Subject to any disclaimer, the term of this patent is extended or adjusted under 35 U.S.C. 154(b) by 775 days.

(21) Appl. No.: 10/539,276

(22) PCT Filed: Dec. 16, 2003

(86) PCT No.: PCT/SE03/01970

§ 371 (c)(1),
(2), (4) Date: Jan. 30, 2006

(87) PCT Pub. No.: WO2004/055842

PCT Pub. Date: Jul. 1, 2004

(65) Prior Publication Data

US 2006/0126262 A1  Jun. 15, 2006

(30) Foreign Application Priority Data

Dec. 17, 2002 (SE) .................................. 0203748

(51) Int. Cl.
*B23K 3/02* (2006.01)
*B23K 3/03* (2006.01)
*H01G 5/00* (2006.01)

(52) U.S. Cl. ..................... 228/262.5; 228/51; 228/56.1; 126/413; 126/240; 118/730

(58) Field of Classification Search ............. 228/262.5, 228/51, 56.1; 126/413, 240; 118/730
See application file for complete search history.

(56) References Cited

U.S. PATENT DOCUMENTS

| 1,425,633 | A | * | 8/1922 | Colby | ........................ 219/421 |
| 3,259,816 | A | * | 7/1966 | Katchman | .................... 361/323 |
| 3,424,957 | A | * | 1/1969 | Katchman | .................... 361/318 |
| 3,480,759 | A | * | 11/1969 | Sachs et al. | .................. 219/242 |
| 4,493,449 | A | * | 1/1985 | Kleiman | ........................ 228/7 |

FOREIGN PATENT DOCUMENTS

| DE | 2841593 A1 | 4/1980 |
| EP | 1112803 A1 * | 7/2001 |
| FR | 2534738 A1 | 4/1984 |
| GB | 2159329 A | 11/1985 |

* cited by examiner

*Primary Examiner*—Jessica L Ward
*Assistant Examiner*—Erin B Saad
(74) *Attorney, Agent, or Firm*—Venable LLP; Eric J. Franklin

(57) ABSTRACT

A method for manufacturing a power capacitor including at least one capacitor element and equipment for carrying out the method. The capacitor element includes a roll of alternate dielectric films and electrode films. The roll has first and second end surfaces facing away from each other. The electrode films are connectably exposed. A solder tip is preheated in a pot with a preheated solder. The solder tip is coated with solder, whereupon at least one of the surfaces of the capacitor element is coated with solder by bringing the solder tip into contact with the end surface. The contact is brought to cease. At least one lead is fixed by soldering to the end surface.

22 Claims, 4 Drawing Sheets

POWER CAPACITOR

TECHNICAL FIELD

The present invention relates to a method for manufacturing a capacitor for temporary storage of electrical energy comprising at least one capacitor element comprising a roll of alternate dielectric films and electrode films, wherein the roll has two first and second end surfaces, facing away from each other, in which said electrode films are connectably exposed. More particularly, the present invention relates to a method for manufacturing power capacitors. The invention also relates to equipment for carrying out such a method.

BACKGROUND ART

A power capacitor is usually composed of a plurality of parallel-connected strings of a number of sub-capacitors, so-called capacitor elements. Each string comprises a plurality of series-connected capacitor elements. Each capacitor element comprises a number of very thin layers of electrodes of thin aluminium foils separated by films of dielectric material, usually in the form of polymer films wound into a roll which is flattened to be capable of being optimally stacked into a package. The package is placed in a capacitor container filled with an electrically insulating liquid. The capacitor elements are interconnected in a matrix and are connected to two insulating bushings, whereby the number of series-connected and parallel-connected capacitor elements, respectively, is determined by the capacitance desired in the capacitor. Usually, also a fuse is connected in series with each element. In addition to elements and fuses, the capacitor also comprises special resistors for discharge of residual charges.

In certain commercially available capacitors, the capacitor elements are arranged such that the aluminium foil of the first electrode at the first end surface of the capacitor element projects outside the edge of the polymer films, whereas at the same first end surface of the capacitor element, the edge of the second adjacent aluminium foil, serving as an opposite electrode, is arranged with its edge inside the edge of the polymer films. In a corresponding way, the aluminium foil of the second electrode is arranged such that, at the second end surface of the capacitor element, it projects outside the edge of the polymer films, whereas the edge of the aluminium foil of the first electrode at the second end surface is arranged with its edge inside the edge of the polymer films.

The capacitor elements are arranged with leads connected to the respective electrode at the respective end surface. The leads, in their turn, are connected to fuses, discharge resistors, busbars, or other devices for interconnection of the capacitor elements or for connection to the insulated bushings.

Usually, the leads are connected to the aluminium foils, which constitute electrodes, by soldering. To make possible this soldering, a first pre-soldering is required. The object of the first pre-soldering is to remove the aluminium oxide that constitutes the surface layer of the aluminium foil, and to create a surface on the capacitor element against which the lead may be soldered with an acceptable soldering result. The solder that is used in the pre-soldering consists, for example, of 75% tin and 25% zinc.

After the first pre-soldering, a second pre-soldering is usually carried out. During the second pre-soldering, a solder cake is created on the first pre-soldering, into which the lead may be soldered. The solder used during the second pre-soldering consists, for example, of 50% tin and 50% lead.

In known methods for supplying solder, for example in the form of pellets or wire, for the above-described first pre-soldering, the solder tip tends to be coated and oxidized. For this reason, it has not been possible to automate the first pre-soldering but it has been necessary to use a manual method that permits an operator to adapt the soldering to the degree of coating and oxidation of the soldering tip, and, where necessary, to clean the solder tip. The manual method also becomes operator-dependent and therefore runs the risk of resulting in a non-uniform quality.

SUMMARY OF THE INVENTION

The object of the invention is to make possible an automated manufacturing method for an automatic first pre-soldering of a capacitor element that entails a uniform quality.

This object is achieved according to the invention by a method and by equipment for carrying out the method.

When manufacturing a power capacitor comprising at lest one capacitor element, wherein the capacitor element comprises a roll of alternate dielectric films and electrode films, the roll has first and second end surfaces, facing away from each other, in which said electrode films are connectably exposed. A solder tip is heated to a suitable temperature in a pot with a preheated solder and solder adheres to the solder tip by capillary forces. Thereafter, the solder tip applies the solder to at least one of the end surfaces of capacitor elements by causing the solder tip with solder to be brought into contact with said end surface. The contact between the solder tip and the end surface is brought to cease. Thereafter, at least one lead is fixed by soldering to said end surface.

The object of the invention is achieved by means of equipment for carrying out the method described above, wherein the equipment comprises a solder pot and a solder head that is arranged with a first linear module for movements in the x-direction (horizontally) and a second linear module for movements in the y-direction (vertically). The equipment also comprises a press unit for fixing the capacitor elements. The solder pot, the solder head, the first and second linear modules and the press unit are arranged on a steel frame.

Since the solder tip is immersed into the solder pot until it reaches a temperature suitable for the chosen first pre-soldering process, and the solder tip is simultaneously coated with solder, the solder tip is oxidized to a considerably smaller extent than when applying the prior art. This means that the need of operator interference is reduced and that therefore the first pre-soldering may be automated. An automatic first pre-soldering entails lower costs and ensures a uniform quality.

BRIEF DESCRIPTION OF THE DRAWINGS

The invention will be described in greater detail in the following with reference to the accompanying drawings, wherein.

DESCRIPTION OF THE PREFERRED EMBODIMENTS

Figure 1:
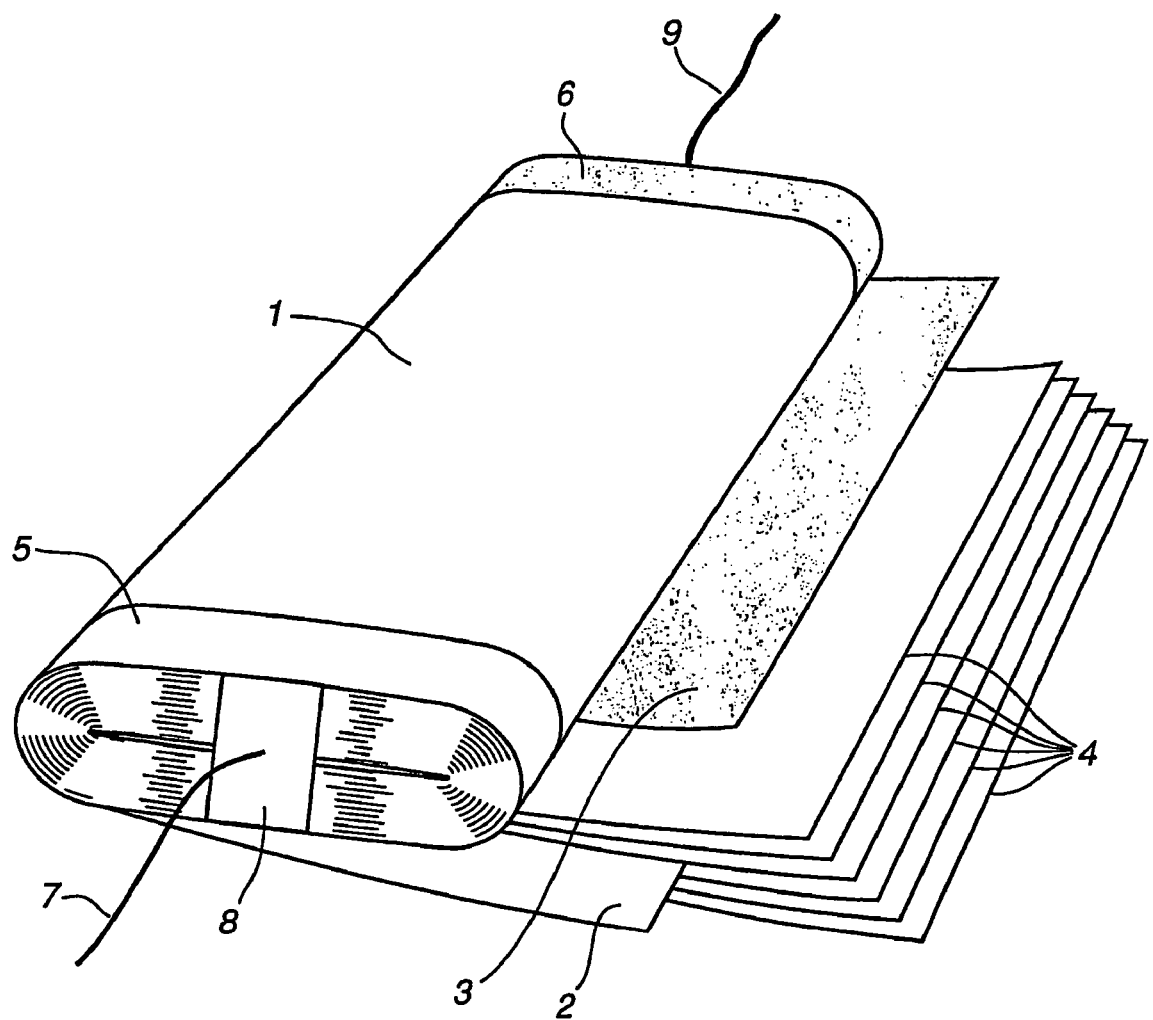
FIG. 1 is a perspective sketch of a capacitor element with leads fixed by soldering.

FIG. 1 shows how a capacitor element 1 for a capacitor is wound from a first electrically conducting aluminium foil 2 and a second electrically conducting aluminium foil 3, which constitute the electrodes of the capacitor element. The foils are separated by electrically insulating films 4 of a dielectric material, preferably a polymer material. The capacitor element 1 comprises very long foils and films, respectively, which are wound into a roll with a flattened cross section. The first aluminium foil 2, which constitutes the first electrode, is arranged at the first end surface of the capacitor element such that it projects outside the edge of the polymer films 4. At the same first end surface of the capacitor element, the edge of the adjacent second aluminium foil 3, acting as an opposite electrode, is arranged with its edge inside the edge of the polymer films 4. The first end 5 of the capacitor element is thus in the form of a flattened roll of the aluminium foil 2 only. In a corresponding way, the aluminium foil 3 of the second electrode is arranged such that the second end 6 of the capacitor element consists of a flattened roll of the second aluminium foil 3 only. At the first end 5 of the capacitor element, a first lead 7 is connected to the aluminium foil 2 by a first solder 8. In a corresponding way, a second lead 9 is connected by means of a second solder (not shown) at the second end 6 of the capacitor element.

Figure 2:
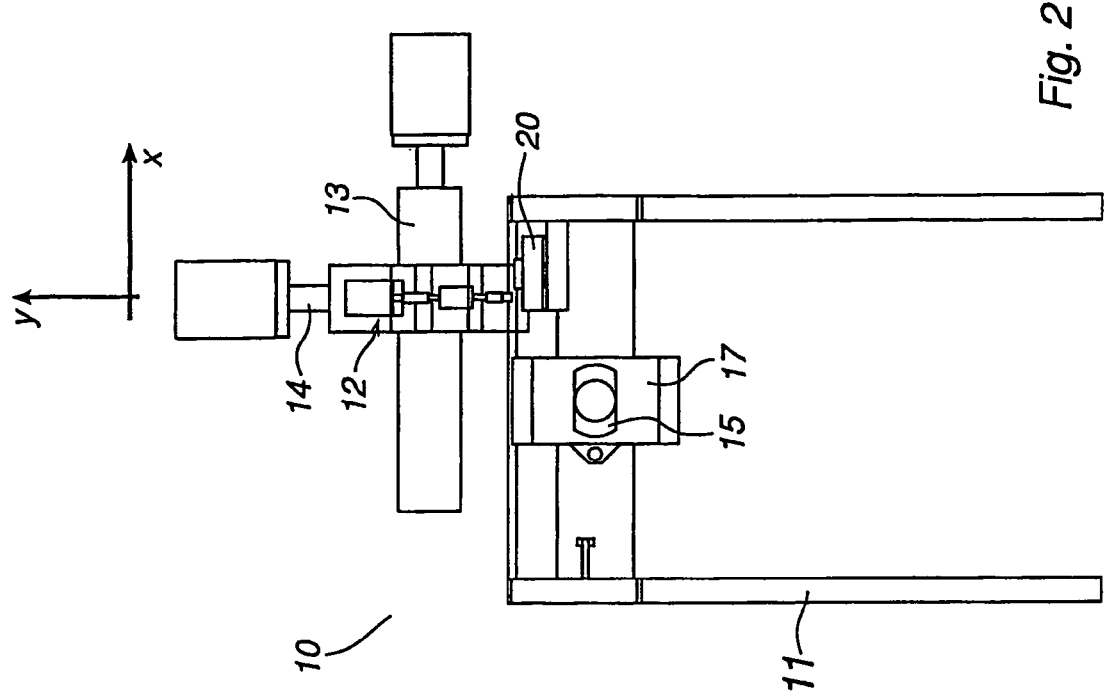
FIG. 2 shows equipment for an automated first pre-soldering of capacitor elements.
Figure 2:
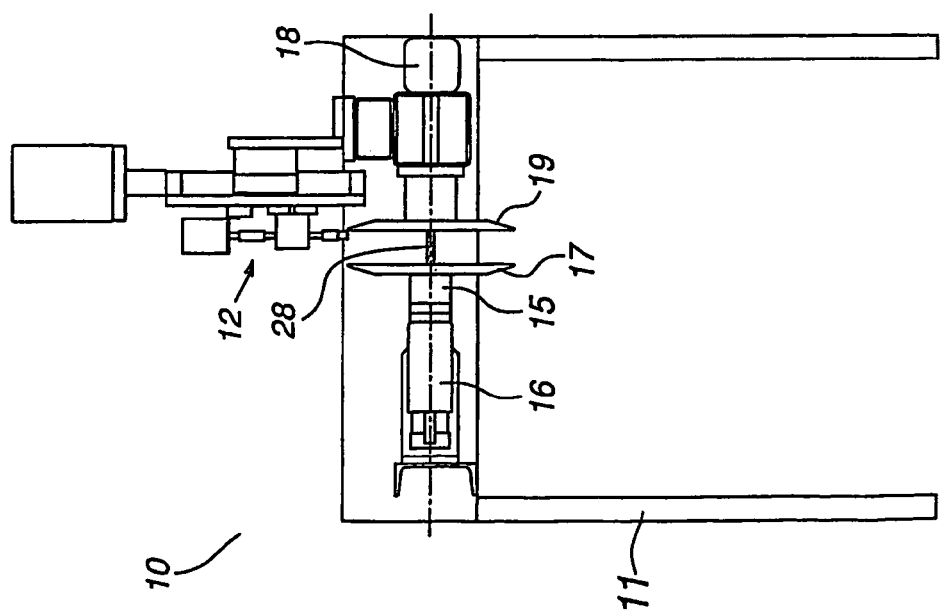

FIG. 2 shows equipment 10 for an automatic first pre-soldering of the capacitor element. The equipment comprises a welded steel frame 11 on which the various functional components are mounted. The functions are controlled by a Programmable Logic Controller (PLC) and the equipment has a control panel from which the equipment is operated. The soldering is carried out by a solder head 12, the detailed design of which is clear from FIG. 3. The movement of the solder head in the x-direction is controlled by a linear module 13 provided with a ball screw. The movement of the solder head in the y-direction is controlled by a linear module 14 applied to the linear module 13 and provided with a ball screw. The equipment 10 has a press unit 15 that fixes the capacitor elements 1. The press unit 15 comprises a pneumatic cylinder 16 and a ball-mounted press plate 17. A turning unit 18 with a press plate 19 is arranged so as to be able to fix the capacitor elements 1 in three different positions, 0°, 90°, and 180°. The ball-mounted press plate 17 is connected to the press plate 19 by a guide plunger 28. The equipment 10 is provided with a solder pot 20 in which the solder required for the pre-soldering is kept liquid. The temperature of the solder in the solder pot 20 may be preset in a stepless manner.

The capacitor elements 1 are loaded manually in the equipment 10 when the press unit 15 is in the "open" position and in the turn position 90°. A capacitor element is brought down between the plates 17 and 19 until the long side of the capacitor element contacts a stop provided on the press plates. Then, the capacitor element is pushed along the press plates until that element is in the correct position for pre-soldering, whereby the end surface breaks a photocell. When the capacitor element is in the right position, it is fixed with the aid of the pneumatic press plate 17.

Figure 3:
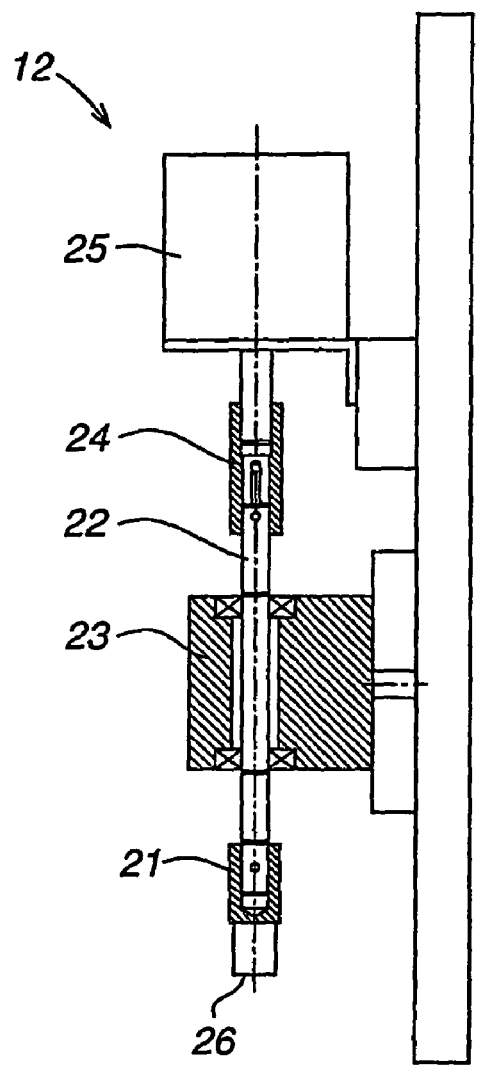
FIG. 3 shows the shape of the solder head.

FIG. 3 shows the fundamental design of the solder head 12. A solder tip 21 is fixedly arranged on a shaft 22 by means of an openable joint. The solder tip is arranged with an active tip 26. During the first pre-soldering, the active tip 26 transfers solder to that end of the capacitor element which is to be coated with solder. The shaft 22 is journalled in a bearing housing 23. The bearing housing 23 permits axial movement of the shaft 22. The shaft 22 is connected to a turning device 25 via an insulating shaft 24. The connection between the solder tip 21, the shaft 22, the insulating shaft 24 and the turning device 25 is designed such that the rotating movement of the turning device 25 is transmitted to the solder tip 21. The joint between the shaft 22 and the insulating shaft 24 is arranged to permit a relative axial movement, here designated "partially floating suspension". The relative axial movement may be blocked by a device therefor. This type of suspension is here designated "fixed suspension". When a relative axial movement is allowed, the total weight of the solder tip 21 and the shaft 22 and the friction in the bearing housing 23 will determine the contact pressure between the active tip 26 and that end 5 or 6 of the capacitor element which is to be coated with solder. When a relative movement is not possible, the first pre-soldering will occur at that unambiguous axial level at which the active tip 26 is arranged. The shape of the solder head 12 permits the solder tip 21 to be replaced and permits solder tips 21 of various shapes to be used. The turning device 25 is arranged so that a rotating movement may be transmitted to the solder tip during the first pre-soldering. The rotating movement may be reversing.

Figure 4:
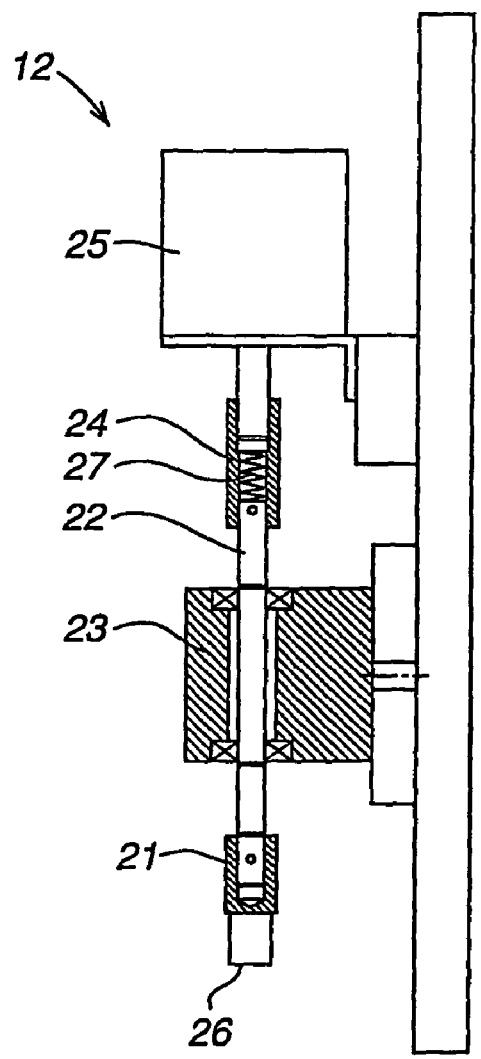
FIG. 4 shows an alternative embodiment of the solder head.
Figure 5A:
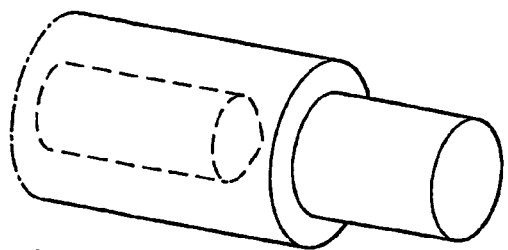
FIG. 5 shows alternative embodiments of the solder tip.
Figure 5B:
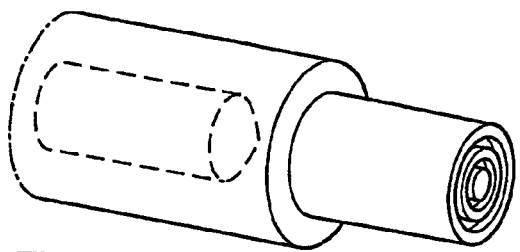
Figure 5C:
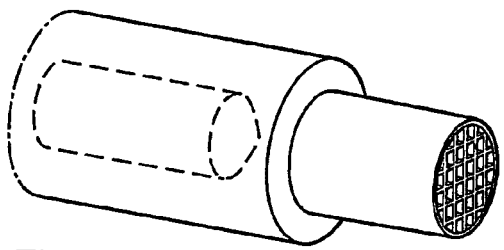
Figure 5D:
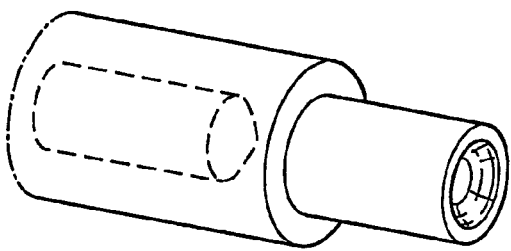
Figure 5E:
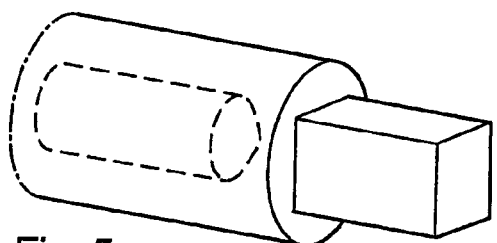

FIG. 4 shows an alternative embodiment of the solder head. In this embodiment, a compression spring 27 is arranged between the turning device 25 and the shaft 22. When the relative axial movement is not blocked, the contact pressure between the active tip 26 and the capacitor element 1 will be determined by the total weight of the solder tip 21, the shaft 22 and the compression spring 27 and by the friction in the bearing box 23 plus the compression of the compression spring. This type of suspension is here designated "floating suspension with compression spring".

The device described above may be modified and varied in different ways within the scope of the basic concept of the invention.

FIG. 5 shows alternative embodiments of the active tip 26. In FIGS. 5*a*-*d*, the active tip 26 is arranged with a rotationally symmetrical cross section. In FIG. 5*a*, the active tip 26 is arranged with a smooth end surface. In FIG. 5*b*, the active tip 26 is arranged with an end surface with circular recesses which, for example, are produced by turning. In FIG. 5*c*, the active tip 26 is arranged with recesses so that a grid-like pattern is formed on the end surface. In FIG. 5*d*, the active tip 26 is arranged with a cup-shaped recess on the end surface. In FIG. 5*e*, the active tip 26 is arranged with a rectangular cross section. The shape of the active tip is not limited to these embodiments but a plurality of other embodiments are feasible. The dimensions of the active tip, for an optimum first pre-soldering, are adapted to the geometry of the capacitor element 1.

The object of the first pre-soldering is to remove the aluminium oxide from the aluminium foil 2, 3 and hence create a surface against which the leads 7, 9 may be soldered with an acceptable soldering result. The solder that is used for the first pre-soldering consists, for example, of Sn 75%, Zn 25%, but other solders with different compositions are also feasible. The solder is preheated in the solder pot to an operating temperature adapted to the current solder and the chosen first pre-soldering process, for example 355° C., but other temperatures in the interval of 300° C. to 400° C. are also feasible.

The solder tip 21 is immersed into the solder pot 20 to a depth of about 10 mm below the solder level. Levels both larger and smaller than 10 mm are also feasible. The solder tip 21 remains immersed into the solder pot 20 until it has reached a temperature in the interval of 300° C. to 400° C., suitable for the chosen first pre-soldering process. Simultaneously with the solder tip 21 being preheated, the active tip 26 is coated with liquid solder by the capillary force.

After the solder tip 21 has been preheated to the preselected temperature and the active tip 26 has been coated with solder, the solder head is moved with the aid of the linear modules 13 and 14 to the preselected position for the first pre-soldering. The solder tip 21 is lowered to the level that brings the active tip 26 into contact with the end, 5 or 6, of the capacitor element, whereby the contact pressure is determined by the level and the suspension of the contact head: partially floating, fixed, or floating with spring.

Figure 6:
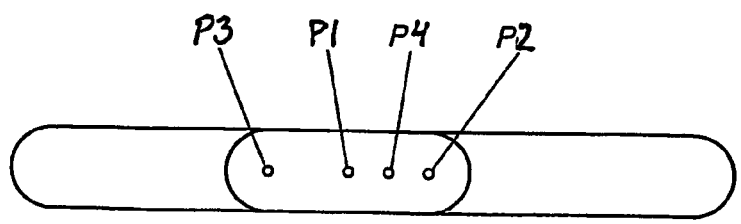
FIG. 6 shows the movement of the solder tip along the end surface of the capacitor element.

After contact has been established, the solder tip 21 is moved along the first 5 or second 6 end of the capacitor element. A proposed movement pattern is illustrated in FIG. 6. The initial contact occurs at a starting point P1. The solder tip is then moved to a second position P2, where it changes is direction of movement and is moved to a third position P3. The movement pattern thereafter comprises one or more further cycles with movements between the second P2 and third P3 positions, whereupon the tip is moved to an end point P4, from where the solder tip 21 is lifted from the first 5 or second 6 end of the capacitor element.

Simultaneously with the solder tip 21 being moved according to the movement pattern described above, it is brought to rotate by the turning device 25. The rotational movement is reversing between two end positions, whereby the rotation in each direction is less than one complete turn.

In addition to the movement pattern described above in combination with the rotational movement, the first pre-soldering may, of course, be carried out in accordance with other movement diagrams comprising movements in both the x- and y-directions and with or without rotation.

The invention claimed is:

1. A method for manufacturing a power capacitor comprising at least one capacitor element, wherein the capacitor element comprises a roll of alternate dielectric films and electrode films, wherein the roll has first and second end surfaces, facing away from each other, in which said electrode films are connectably exposed, the method comprising:
    preheating a solder tip in a solder pot with a preheated pre-solder, wherein the pre-solder is a solder material, wherein the solder tip is arranged on a shaft, whereby the shaft is journalled in a bearing housing which permits relative axial movement,
    automatically coating the solder tip with pre-solder in the solder pot through capillary forces,
    coating at least one of the end surfaces of the capacitor element with the pre-solder by bringing the coated solder tip into contact with said at least one end surface of the capacitor element, wherein the solder tip when first being brought into contact with the end of the capacitor element presses down the end surface of the capacitor element, wherein the depth into which the solder tip is pressed down is determined by the total weight of the solder tip and the shaft and by the friction in the bearing housing, and wherein the solder tip is pressed down to a depth of between 0 and 6 mm in the end surface of the capacitor element,
    moving the solder tip along the at least one end surface of the capacitor element,
    ceasing the contact between the solder tip and said at least one end surface of the capacitor element, and
    fixing at least one lead to said pre-solder by soldering the at least one lead to said pre-solder on said at least one end surface of the capacitor element with another solder material,
    wherein at least the pre-soldering of the at least one end surface of the capacitor element is automated.

2. The method according to claim 1, wherein the capacitor element is wound from the electrode films, comprising a first aluminum foil and a second aluminum foil, with at least one intermediate dielectric film of a polymer material, wherein the first aluminum foil at the first end surface of the capacitor element is arranged so as to project outside the edge of the polymer film, whereas at the same first end surface of the edge of the capacitor element the edge of the second aluminum foil is arranged with its edge inside the edge of the polymer film so that the end of the capacitor element exhibits the shape of a roll of the first aluminum foil only and the second aluminum foil is arranged so that the second end of the capacitor element in a corresponding way exhibits the shape of a roll of the second aluminum foil only, that wherein the solder tip comprises an active tip which is coated with the pre-solder, and wherein the solder tip, after having been brought into contact with the end surface of the capacitor element, is moved along the end surface of the capacitor element.

3. The method according to claim 2, wherein the movement is carried out in one sequence comprising a starting point, two turning points between which the solder tip is moved in one or more cycles, and one end point from which the solder tip is removed from the end surface of the capacitor element, whereby the first or the second turning point may be the same as the starting point or the end point.

4. The method according to claim 2, wherein the speed of movement of the solder tip along the end of the capacitor element is between 0 m/s and 0.1 m/s.

5. The method according to claim 1, wherein the total weight which determines the depth into which the solder tip is pressed down also includes the compression spring, and wherein the compression of the compression spring also determines the depth into which the solder tip is pressed down.

6. The method according to claim 1, wherein the solder tip during the pre-soldering is brought to rotate in the direction of rotation of the shaft.

7. The method according to claim 6, wherein the solder tip is brought to rotate in one or the other direction of rotation, or wherein the rotation is reversing.

8. The method according to claim 7, wherein the rotation is less than one complete turn, that is, is less than 360°.

9. The method according to claim 1, wherein the temperature of the pre-solder in the solder pot is in the interval of between 300° C. and 400° C.

10. The method according to claim 1, wherein the pre-solder comprises tin and zinc.

11. The method according to claim 10, wherein the pre-solder comprises 75% tin and 25% zinc.

12. A method for manufacturing a power capacitor comprising at least one capacitor element, wherein the capacitor element comprises a roll of alternate dielectric films and electrode films, wherein the roll has first and second end surfaces, facing away from each other, in which said electrode films are connectably exposed, the method comprising:
    preheating a solder tip in a solder pot with a preheated pre-solder, wherein the pre-solder is a solder material, wherein the solder tip is arranged on a shaft, whereby the shaft is journalled in a bearing housing that permits relative axial movement, and wherein the shaft is provided with a compression spring,
    automatically coating the solder tip with pre-solder in the solder pot through capillary forces;
    coating at least one of the end surfaces of the capacitor element with the pre-solder by bringing the coated solder tip into contact with said at least one end surface of the capacitor element, wherein the solder tip when first being brought into contact with the end of the capacitor element presses down the end surface of the capacitor element, whereby the depth into which the solder tip is pressed down is determined by the total weight of the solder tip, the shaft and the compression spring, the friction in the bearing housing plus the compression of the compression spring, and wherein the solder tip is pressed down to a depth of between 0 and 6 mm in the end surface of the capacitor element;

moving the solder tip along the at least one end surface of the capacitor element;

ceasing the contact between the solder tip and said at least one end surface of the capacitor element; and fixing at least one lead to said pre-solder by soldering the at least one lead to said pre-solder on said at least one end surface of the capacitor element with another solder material, wherein at least the pre-soldering of the at least one end surface of the capacitor element is automated.

13. The method according to claim 12, wherein the capacitor element is wound from the electrode films, comprising a first aluminum foil and a second aluminum foil, with at least one intermediate dielectric film of a polymer material, wherein the first aluminum foil at the first end surface of the capacitor element is arranged so as to project outside the edge of the polymer film, whereas at the same first end surface of the edge of the capacitor element the edge of the second aluminum foil is arranged with its edge inside the edge of the polymer film so that the end of the capacitor element exhibits the shape of a roll of the first aluminum foil only and the second aluminum foil is arranged so that the second end of the capacitor element in a corresponding way exhibits the shape of a roll of the second aluminum foil only, that wherein the solder tip comprises an active tip which is coated with the pre-solder, and wherein the solder tip, after having been brought into contact with the end surface of the capacitor element, is moved along the end surface of the capacitor element.

14. The method according to claim 13, wherein the movement is carried out in one sequence comprising a starting point, two turning points between which the solder tip is moved in one or more cycles, and one end point from which the solder tip is removed from the end surface of the capacitor element, whereby the first or the second turning point may be the same as the starting point or the end point.

15. The method according to claim 13, wherein the speed of movement of the solder tip along the end of the capacitor element is between 0 m/s and 0.1 m/s.

16. The method according to claim 12, wherein the depth into which the solder tip is pressed down is also determined by the friction in the bearing housing.

17. The method according to claim 12, wherein the solder tip during the pre-soldering is brought to rotate in the direction of rotation of the shaft.

18. The method according to claim 17, wherein the solder tip is brought to rotate in one or the other direction of rotation, or wherein the rotation is reversing.

19. The method according to claim 18, wherein the rotation is less than one complete turn, that is, is less than 360°.

20. The method according to claim 12, wherein the temperature of the pre-solder in the solder pot is in the interval of between 300° C. and 400° C.

21. The method according to claim 12, wherein the pre-solder comprises tin and zinc.

22. The method according to claim 10, wherein the pre-solder comprises 75% tin and 25% zinc.

* * * * *